Patented Nov. 4, 1941

2,261,788

UNITED STATES PATENT OFFICE 2,261,788

PROCESS FOR THE PREPARATION OF A COMPOSITION OF TRIMETHYLOLNITROMETHANE

Joseph A. Wyler, Allentown, Pa., assignor to Trojan Powder Company, Allentown, Pa.

No Drawing. Application February 20, 1939, Serial No. 257,483

7 Claims. (Cl. 260—635)

This invention relates to the condensation of nitromethane and formaldehyde to trimethylolnitromethane.

It is well known that nitromethane and formaldehyde react, in alkaline media to form trimethylolnitromethane. It is also known that the reactions involved in this condensation are reversible. Thus, we may express the condensation as follows:

$$CH_3NO_2 + CH_2O \rightleftharpoons CH_2(NO_2)CH_2OH$$

$$CH_2(NO_2)CH_2OH + CH_2O \rightleftharpoons CH(NO_2)(CH_2OH)_2$$

$$CH(NO_2)(CH_2OH)_2 + CH_2O \rightleftharpoons C(NO_2)(CH_2OH)_3$$

so that, it is clear that if at least 3 molecules of $CH_2O$ are present for each molecule of nitromethane, we may expect the formation of $C(NO_2)(CH_2OH)_3$ in good yield. This is actually the case with modern processes. In general, it may be stated that 90% of theory yields are obtainable.

Now, a consideration of the third reaction given above indicates that there will always be some free $CH_2O$ present in the aqueous reaction mixtures in which the trimethylolnitromethane is produced. This free $CH_2O$ is an undesirable impurity. It has a pronounced effect upon the stability of the product which results upon the nitration of the trimethylolnitromethane containing it.

It is an object of my invention to destroy this free formaldehyde in order to obtain a product of increased usefulness. Another object is to convert this free formaldehyde into a product which may be nitrated along with the trimethylolnitromethane and which does not have a harmful effect upon the nitrated trimethylolnitromethane produced. A still further object is to shorten the process for the preparation of trimethylolnitromethane as described below. Other and further objects will become apparent upon a perusal of the specification and claims.

Present processes for the preparation of trimethylolnitromethane generally consist in using a solution of formaldehyde in water, in aqueous alcohols, or in an alkyl ester, mixing this solution with the desired amount of nitromethane and adding sufficient alkali to the mixture to cause it to become just slightly alkaline. The reaction proceeds, slowly at first, and more rapidly later, as the mixture heats up spontaneously, and is accompanied by the formation of brownish colored resins—particularly near the end of the reaction and at elevated temperatures.

A typical well known procedure is as follows:

20 parts (by weight) of nitromethane are added to 100 parts (by weight) of 30% (by weight) formaldehyde and the mixture made just slightly alkaline to litmus with, say, $NaHCO_3$. This mixture at room temperature, and contained in a suitable tank provided with a stirrer and indirect cooling, is stirred and allowed to react at a temperature less than 50°–60° C. After the main reaction is over, the stirring may be discontinued and the mixture allowed to stand for several hours or several days to complete the reaction. The product thus made has the disadvantages mentioned above.

In my copending application, S. N. 211,802, there is disclosed the use of oxalates to prevent the formation of the above mentioned brownish colored resins which of course lower the yield of trimethylolnitromethane obtained, and although I prefer to use these oxalates in my present process, I may at times do without them.

I have discovered that if the reaction product, formed essentially as described above, is treated with about 1–3 parts (by weight) of 26% ammonia water, or an amount of an ammonium salt equivalent to the ammonia and then allowed to react at room or elevated temperatures, the resulting mixture may, upon slight acidification with an acid as sulphuric acid, be evaporated under reduced pressure and actually grained to a fine, dry, crystalline powder which is suitable for direct nitration, without the necessity of purifying or otherwise treating this product, as is the case of the product made in all known processes.

The main result of adding the ammonia is probably the formation of hexamethylenetetramine, as follows:

$$6CH_2O + 4NH_3 = (CH_2)_6N_4 + 6H_2O$$

and this hexamethylenetetramine, of course, nitrates along with the trimethylolnitromethane when the product is subjected to nitration.

Furthermore, since the quantity of ammonia used is always in slight excess to the free $CH_2O$ present at the end of the reaction, there will always be some salt of ammonia present during the evaporation and graining step of the process, and consequently, as any additional free $CH_2O$ forms in accordance with the reversible reactions given above (which reactions are very slow in the direction of right to left) it reacts with this ammonia salt to form hexamethylenetetramine. In those cases where an ammonium salt, as $(NH_4)_2SO_4$, has been used in place of the free ammonia, there will always be some ammonium salt, as $(NH_4)_2SO_4$, present to react with the $CH_2O$ to form hexamethylenetetramine.

The new and useful result obtained is the shortening and cheapening of the process for the preparation of trimethylolnitromethane, particularly when the product is to be used for the manufacture of explosives. Trimethylolnitromethane is extremely soluble in water, even in the cold, and therefore, the ordinary crystallization method consisting of cooling a hot solution so as to effect a separation of crystals is laborious and unsatisfactory. By converting the free $CH_2O$ to $(CH_2)_6N_4$ I am able to readily evaporate the reaction product to dryness, thus obtaining a fine dry powder through continuous stirring during the evaporation. Without this destruction of the $CH_2O$ the residue upon evaporation would be gummy, colored and unsatisfactory, and would require further purification by means of solvents as alcohols, alkyl acetates, etc.

In order to more clearly point out my invention the following examples in which all proportions are by weight are given.

Example #1

100 parts of 30% formaldehyde are placed in a suitable reaction vessel provided with a stirrer and a jacket for cooling or heating as the case may require, and 20 parts of nitromethane are then added. To this, about 1 part of sodium oxalate and sufficient $NaHCO_3$ to produce an alkalinity toward litmus are added, with stirring. The mixture soon warms up spontaneously and cooling water is then run through the jacket in order to prevent a too rapid rise in temperature. A temperature of 40–50° C. is preferred, but temperatures of 80–95° C. have been used at times. There is no advantage in allowing the temperature to rise above 95° C. After the main reaction (as indicated by no further rise in the temperature) is over, the stirrer may be stopped and the mixture allowed to stand several hours or several days. To this mixture are then added 1–3 parts of 26% ammonia water (just slightly more than is needed to react with the $CH_2O$) and, after stirring and warming to about 60° C., a sufficient amount of sulphuric acid to produce a slight acidity. The mixture is now evaporated, under reduced pressure, with stirring, in a suitable apparatus, such as a grainer of the type usually used to grain ammonium nitrate. The fine, dry powder which forms is the finished product.

Example #2

The same as under Example #1, except that no oxalate is used.

In this case the product will have a brownish color and although its yield is not as good and its quality is not as satisfactory as that made in accordance with Example #1, it will be satisfactory for direct nitration.

Example #3

30 parts of paraformaldehyde are added to 100 parts of butyl alcohol and the mixture stirred. Then add about 1 part of calcium oxalate, followed by 20 parts of nitromethane and sufficient potassium bicarbonate to produce an alkalinity toward litmus, in the mixture. The reaction is allowed to proceed at temperatures as high as about 95–100° C., in which case it is essentially completed in about 2–3 hours, when about 1–3 parts of 26.0% ammonia water are added and the mixture stirred at temperatures above 40° C. for about one-half hour to complete the reaction between the formaldehyde and the ammonia. This mixture is then made just slightly acid and handled in the same manner as described in Example #1.

I wish to emphasize that the above examples are given for purposes of illustration and clarity and that I do not confine myself to the specific details mentioned therein. I may, for instance, use any alkali, such as KOH, NaOH, $Ca(OH)_2$, $K_2HPO_4$, $Na_2HPO_4$, $(C_2H_5)_4N(OH)$, $(CH_3)_3N$, $(CH_3)_2NH$, $(CH_3)NH_2$, and the like for the purpose of establishing an alkalinity in the mixture. Or, I may use, in place of water, as a medium in which to conduct the condensation, such liquids as methyl, ethyl, propyl, butyl, amyl or hexyl alcohols or their formates, acetates or propionates. Also, I may use the $CH_2O$ in gaseous, solution or polymerized form. Then again, I may vary my times, temperatures and concentrations of reactants over wide ranges, depending upon conditions which may happen to exist in the plant and I may obtain my crystals of trimethylolnitromethane plus hexamethylenetetramine in any suitable manner from the final reaction mixture. In other words, I may make any such changes in the operative details of my process as would occur to a workman skilled in this art and I do not limit myself in any way except as indicated in the following claims:

I claim:

1. In the process for the alkaline condensation of mononitromethane and formaldehyde to trimethylolnitromethane, the step consisting of adding a member of the group consisting of ammonia and ammonium salts to the essentially completed reaction mixture.

2. In the process for the alkaline condensation of mononitromethane and formaldehyde to trimethylolnitromethane, the steps comprising adding a member of the group consisting of ammonia and ammonium salts to the hot, essentially completed reaction mixture; maintaining the thus treated mixture at a temperature above 40° C. for at least one-half hour; acidifying with a strong acid, and effecting crystallization of the solid constituents of the mixture.

3. In the process for the alkaline condensation of mononitromethane and formaldehyde to trimethylolnitromethane, the steps comprising adding an amount of a member of the group consisting of ammonia and ammonium salts which is in slight excess to that chemically equivalent to the free $CH_2O$ existing in the reaction mixture at the time of the addition of the $NH_4$ ion, together with any free $CH_2O$ which may form during the subsequent treatment of the reaction mixture; maintaining the thus treated mixture at a temperature above 40° C. for at least one-half hour; acidifying with a strong acid, and effecting crystallization of the solid constituents of the mixture.

4. The process for the preparation of a trimethylolnitromethane composition comprising condensing nitromethane and formaldehyde in alkaline media, the proportion of nitromethane to formaldehyde being approximately 1 molecule $CH_3NO_2$ to 3 molecules of $CH_2O$; treating the condensation mixture with an amount of a member of the group consisting of ammonia and ammonium salts that is in slight excess of that chemically equivalent to the free $CH_2O$ existing in the reaction mixture at the time of the addition of the $NH_4$ ion together with any free $CH_2O$ which may form during the subsequent treatment of the reaction mixture; slightly acidifying the mixture with a strong acid, and effecting crystallization of the solid constituents of the mixture.

5. The process for the preparation of a trimethylolnitromethane composition comprising condensing nitromethane and formaldehyde in a predominately aqueous alkaline media, the proportions of nitromethane to formaldehyde being approximately 1 molecule $CH_3NO_2$ to 3 molecules of $CH_2O$; treating the condensation mixture with an amount of a member of the group consisting of ammonia and ammonium salts that is in slight excess of that chemically equivalent to the free $CH_2O$ existing in the reaction mixture at the time of the addition of the $NH_4$ ion together with any free $CH_2O$ which may form during the subsequent treatment of the reaction mixture; slightly acidifying the mixture with a strong acid, and effecting crystallization of the solid constituents of the mixture.

6. The process for the preparation of a trimethylolnitromethane composition comprising condensing nitromethane and paraformaldehyde in an alkaline medium comprising a predominant proportion of an aliphatic alcohol containing not more than 6 carbon atoms, the proportion of nitromethane to paraformaldehyde being approximately 1 molecule $CH_3NO_2$ to 1 molecule of $(CH_2O)_3$; treating the condensation mixture with an amount of a member of the group consisting of ammonia and ammonium salts that is in slight excess of that chemically equivalent to the free $CH_2O$ existing in the reaction mixture at the time of the addition of the $NH_4$ ion together with any free $CH_2O$ which may form during the subsequent treatment of the reaction mixture; slightly acidifying the mixture with a strong acid, and effecting crystallization of the solid constituents of the mixture.

7. A composition of matter consisting of trimethylolnitromethane, hexamethylenetetramine and a salt of ammonia; the hexamethylenetetramine being present in an amount not to exceed about 10% by weight and the ammonia salt being present in an amount not to exceed the equivalent of about 1.5% of $NH_3$.

JOSEPH A. WYLER.